M. D. BROWN.
Improvement in Animal Traps.

No. 121,324.

Patented Nov. 28, 1871.

Witnesses:

Inventor:
M. D. Brown
PER
Attorneys.

UNITED STATES PATENT OFFICE.

MILTON D. BROWN, OF NEWBURG, TENNESSEE.

IMPROVEMENT IN ANIMAL-TRAPS.

Specification forming part of Letters Patent No. 121,324, dated November 28, 1871.

*To all whom it may concern:*

Be it known that I, MILTON D. BROWN, of Newburg, in the county of Lewis and State of Tennessee, have invented an Improvement in Self-Setting Animal-Traps; and I do hereby declare that the following is a full, clear, and exact description thereof, which will enable others skilled in the art to make and use the same, reference being had to the accompanying drawing forming part of this specification.

Figure 1:
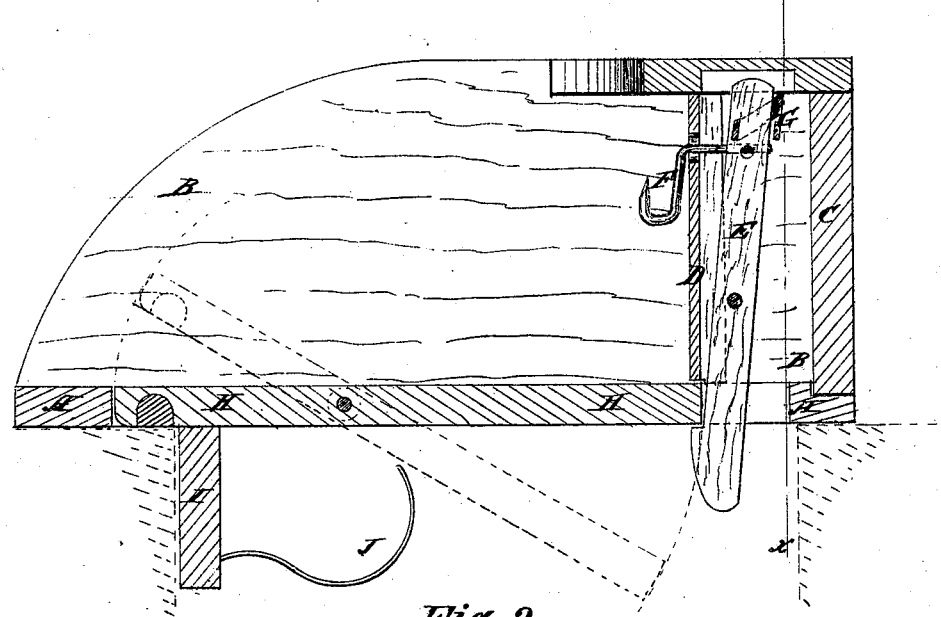
Figure 2:
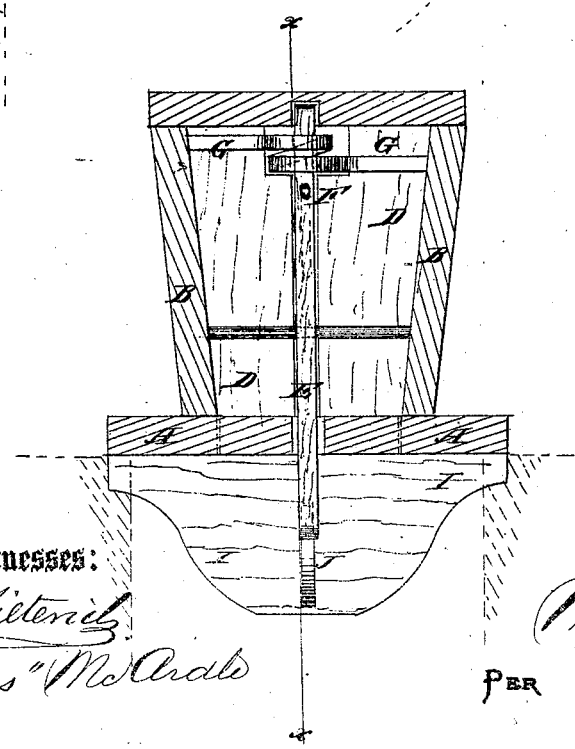

Figure 1 is a vertical longitudinal section of my improved animal-trap taken through the line $x\ x$, Fig. 2. Fig. 2 is a vertical cross-section of the same taken through the line $y\ y$, Fig. 1.

My invention relates to that class of traps where the animal is dropped into a chamber below by treading on a pivoted door or board; and consists in the peculiar arrangement of the bait-hook and catch with respect to the pivoted treadle-board; and it also consists in the construction and combination of the various parts of the trap, as hereinafter more fully described.

The trap is designed to be placed over and secured to a box of suitable size, the bottom and three sides of which may be made of wood lined with tin, and the other or fourth side should be made of wire, cloth, or other suitable grating.

A is the bottom. B are the sides. C is the end of the box or body of the trap. The top and one end of the trap are left open, so that the animal can see clearly all through the trap. The forward end of the trap A B C has a partition, D, placed in it to form a small chamber, in which is placed a lever-catch, E. F is the bait-hook, the shank of which passes through the partition D and is attached to the upper end of the lever-catch E. The lever-catch E is pivoted to the lower part of the sides of the trap A B C, and with its upper end is connected a spring, G, which is so arranged as to draw the upper end of said lever-catch E forward toward the end of the trap. The lower end of the lever-catch E projects through a hole in the bottom A, and has a shoulder formed upon it to receive and hold the edge of the fall H. The entire middle part of the bottom A is cut away, and in the opening thus formed is pivoted the fall H. The fall H is pivoted near its rear end to the bottom A, and its rear or shorter end is weighted so that it will about balance. To the under side of the bottom A, near the rear end of the fall H, is attached a block or bracket, I, to the forward side of which is attached a spring, J. The spring J projects into such a position as to receive the forward end of the drop or fall H, and by its recoil when the animal has dropped from it to raise the said forward end of the fall to its place. As the forward end of the fall H rises it strikes the lower end of the lever-catch E, pushes it back, and is caught and supported by the shoulder of the said catch. The lower end of the lever-catch E is beveled or rounded off to receive the end of the fall H as it rises.

In using the trap a quantity of bait should be scattered about in the cage, and also attached to the hook F. The animal in seeking to reach the bait enters the trap, which seems to be clear and open. He enters without fear, and a slight pull upon the bait disengages the lever-catch E from the forward end of the fall H and allows said fall to be tilted by the animal's weight, precipitating the animal into the cage. As the animal drops from the fall H the said fall is raised to its former position by the recoil of the spring J, again setting the trap.

Having thus described my invention, I claim as new and desire to secure by Letters Patent—

A trap-door, H, and bait-hook F combined, as described, with a lever, E, which holds the bait with one arm and the trap-door with the other, as described.

MILTON D. BROWN.

Witnesses:
JOHN W. BROWN,
CHARLES B. PEERY.

(143)